US012489773B2

United States Patent
Basha et al.

(10) Patent No.: US 12,489,773 B2
(45) Date of Patent: Dec. 2, 2025

(54) ON-PREMISES NETWORK TRAFFIC MONITORING VIA SECURITY AGENT CONFIGURED PORT MIRRORING OF ROUTER DEVICE

(71) Applicant: Microsoft Technology Licensing, LLC, Redmond, WA (US)

(72) Inventors: Yossef Basha, Kadima (IL); Benyamin Farshteindiker, Petah Tikwa (IL); Ran Albagli, Rishon Lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 18/310,486

(22) Filed: May 1, 2023

(65) Prior Publication Data

US 2024/0372881 A1   Nov. 7, 2024

(51) Int. Cl.
*H04L 9/40* (2022.01)
*H04L 43/062* (2022.01)

(52) U.S. Cl.
CPC ........ *H04L 63/1425* (2013.01); *H04L 43/062* (2013.01); *H04L 63/083* (2013.01)

(58) Field of Classification Search
CPC ... H04L 63/1425; H04L 63/083; H04L 63/08; H04L 63/1408; H04L 43/062; H04L 43/12; H04L 41/046
See application file for complete search history.

(56) References Cited

U.S. PATENT DOCUMENTS 7,224,668 B1 * 5/2007 Smethurst ............... H04L 45/60
370/402
9,686,296 B1 * 6/2017 Murchison .............. H04L 63/08
(Continued)

FOREIGN PATENT DOCUMENTS

CN    107409069 A  * 11/2017 ............ H04L 45/021
CN    115314392 A  * 11/2022
(Continued)

OTHER PUBLICATIONS

Anonymous, "macos-SSSH tunnel to home network, and access router web interface—Super User," Retrieved from the Internet URL:—https://web.archive.org/web/20201205232025/https://superuser.com/questions/330131/ssh-tunnel-to-home-network-and-access-router-webinterface, Dec. 5, 2020, 02 Pages.
International Search Report and Written Opinion received for PCT Application No. PCT/US2024/025620, Jul. 9, 2024, 13 pages.
(Continued)

*Primary Examiner* — Sarah Su
(74) *Attorney, Agent, or Firm* — Alleman Hall & Tuttle LLP (57) ABSTRACT

A computing system is provided, including a server computing device configured to execute a security service that communicates with a security agent on a client computing device via a wide area network and an on-premises network on which the client computing device is provisioned, and receive and store, at the server computing device, administrator login credentials for a router device on the on-premises network. The processor is further configured to send a monitoring command to the security agent to cause the security agent to access the router device using the administrator login credentials and configure the router device to forward network traffic received by the router device to the security agent at the client computing device via port mirroring, and receive an on-premises network traffic monitoring report from the security agent based on the network traffic forwarded to the client computing device.

20 Claims, 5 Drawing Sheets

(56) References Cited

U.S. PATENT DOCUMENTS

| | | | |
|---|---|---|---|
| 10,623,283 B2* | 4/2020 | Yadav | H04L 63/145 |
| 2006/0277603 A1 | 12/2006 | Kelso | |
| 2008/0130497 A1* | 6/2008 | Sang Wan | H04L 43/026 |
| | | | 370/230.1 |
| 2009/0249440 A1* | 10/2009 | Platt | H04L 63/0815 |
| | | | 726/1 |
| 2016/0294731 A1* | 10/2016 | McDaniel | H04L 41/0806 |
| 2019/0205511 A1* | 7/2019 | Zhan | H04L 63/1416 |
| 2020/0403826 A1 | 12/2020 | Dawani et al. | |
| 2021/0273953 A1* | 9/2021 | Fellows | G06F 21/554 |
| 2023/0110265 A1* | 4/2023 | Fainberg | H04L 43/0876 |
| | | | 709/224 |
| 2023/0208879 A1* | 6/2023 | Thomas | H04L 63/1425 |
| | | | 726/4 |

FOREIGN PATENT DOCUMENTS

| | | | | |
|---|---|---|---|---|
| WO | WO-0199002 A2 * | 12/2001 | | H04L 41/069 |
| WO | 2018044876 A1 | 3/2018 | | |
| WO | WO-2022066910 A1 * | 3/2022 | | H04L 41/046 |

OTHER PUBLICATIONS

"Device Discovery Overview", Retrieved From: https://learn.microsoft.com/en-us/microsoft-365/security/defender-endpoint/device-discovery?view=o365-worldwide, Feb. 7, 2023, 7 Pages.

"Enable Corelight as Data Source in Microsoft Defender for Endpoint", Retrieved From: https://learn.microsoft.com/en-us/microsoft-365/security/defender-endpoint/corelight-integration?view=o365-worldwide, Feb. 7, 2023, 4 Pages.

"Port Mirroring", Retrieved From: https://en.wikipedia.org/wiki/Port_mirroring#, May 8, 2022, 1 Page.

"Virtual Network TAP", Retrieved From: https://learn.microsoft.com/en-us/azure/virtual-network/virtual-network-tap-overview, Feb. 22, 2023, 4 Pages.

"Why IT and Security Teams Trust Axonius", Retrieved From: https://www.axonius.com/, Retrieved From: Mar. 7, 2023, 11 Pages.

Solomon, et al., "New Network-based Detections and Improved Device Discovery using Zeek", Retrieved From: https://techcommunity.microsoft.com/t5/microsoft-defender-for-endpoint/new-network-based-detections-and-improved-device-discovery-using/ba-p/3682111, Nov. 28, 2022, 11 Pages.

* cited by examiner

ON-PREMISES NETWORK TRAFFIC MONITORING VIA SECURITY AGENT CONFIGURED PORT MIRRORING OF ROUTER DEVICE

BACKGROUND

A network test access point (TAP) is a hardware device that mirrors network traffic and forwards the network traffic to a monitoring security device in real time for detecting and investigating network intrusions or network attacks. For full network visibility and deep packet inspection, large numbers of TAP devices are typically connected to the TAP ports of the multitude of networking devices in the network. By connecting to the TAP ports, these conventional TAP appliances are able to gain sufficient access privileges to read and forward traffic from the networking devices to a separate computing device for analysis. However, deploying large numbers of TAP devices in this manner can be costly and time consuming, particularly when deploying such TAP devices in an organization's on-premises network.

An alternative solution is to deploy networking equipment that is equipped with interfaces that collect samples of network traffic, and send aggregated network information based on these samples to a central server, using sampling protocols such as NETFLOW. However, this requires a configuration of specialized networking equipment that is equipped with the NETFLOW technology, and comes with some data loss as the information is sampled.

SUMMARY

In view of the above, a computing system is provided, comprising a server computing device configured to execute a security service configured to communicate with a security agent on a client computing device via a wide area network and an on-premises network on which the client computing device is provisioned, and receive and store, at the server computing device, administrator login credentials for a router device having a network address on the on-premises network. The processor is further configured to send a monitoring command to the security agent to cause the security agent to access the router device at the network address using the administrator login credentials and configure the router device to forward network traffic received by the router device to the security agent at the client computing device via port mirroring, and receive an on-premises network traffic monitoring report from the security agent based on the network traffic forwarded to the client computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
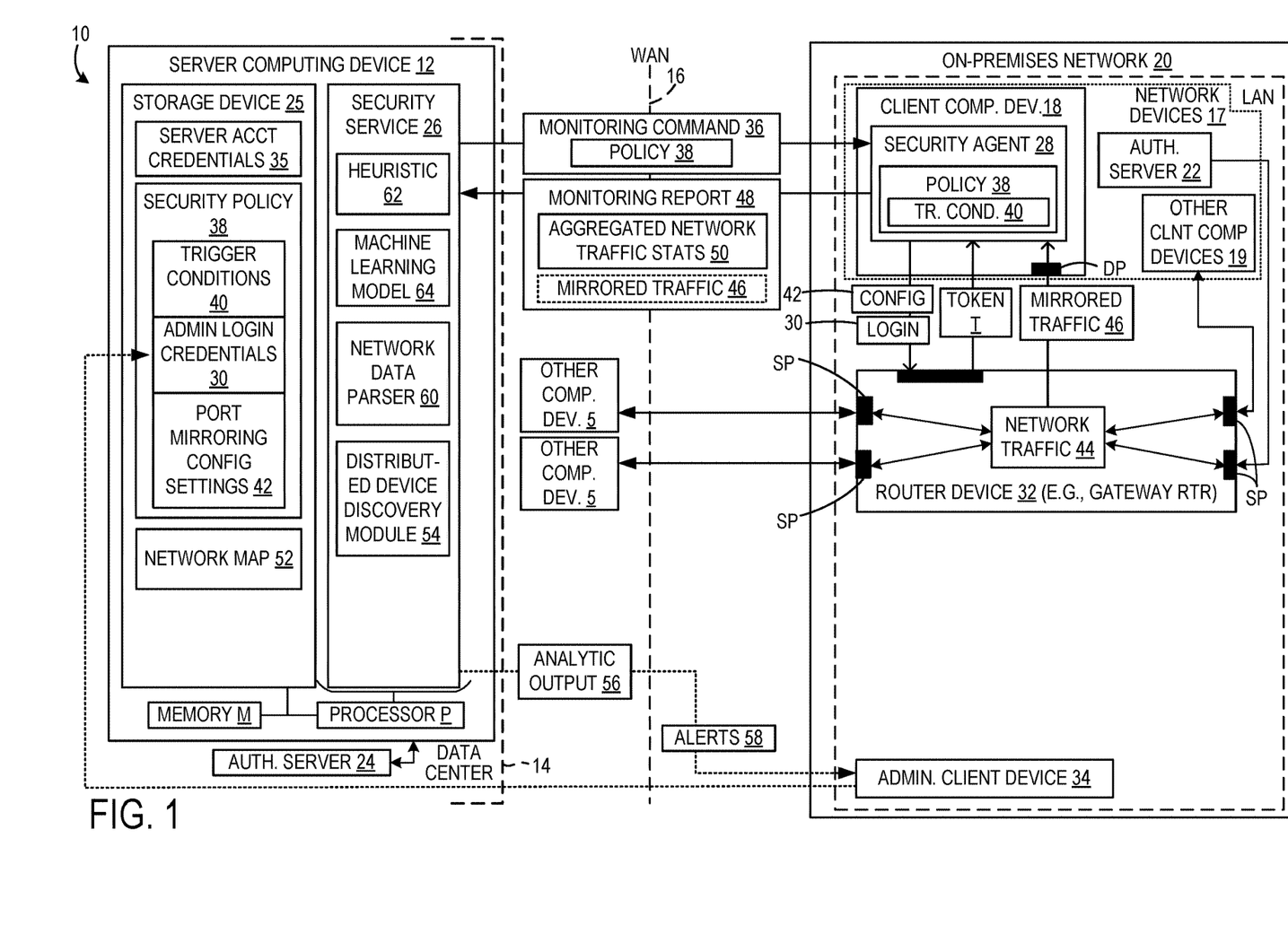
FIG. 1 shows a schematic view of a computing system including a security service of a server computing device that communicates with a security agent of a client computing device of an on-premises network to configure a router device for to monitor on-premises network traffic, in accordance with one example of the present disclosure.

In view of the above issues, the present disclosure describes a system and method for network detection and response (NDR) which can achieve increased visibility to activity on an on-premises network while minimizing computational load and bandwidth on the on-premises network and obviating the need to install multiple dedicated physical TAP appliances directly onto networking devices in the on-premises network. Referring initially to FIG. 1, an example computing system 10 is depicted including a server computing device 12 that is provisioned in a data center 14 and is configured to communicate via a wide area network (WAN) 16 with a plurality of client computing devices 18 provisioned on an on-premises network 20 of an organization. It will be appreciated that the server computing device 12 is part of a server system that implements cloud services, and the organization is a subscriber of such cloud services. The organization, as a subscriber, has authorized certain client computing devices 18 connected to the on-premises network 20 to communicate with the server computing device 12 to implement the services, as managed endpoints. The on-premises network 20 includes a client-side authentication server 22 that authenticates requests from users and client computing devices 18 for resources such as servers and networking hardware on the on-premises network 20, thus controlling access to these resources. Likewise, server computing device 12 communicates with a server-side authentication server 24 that authenticates requests from users and devices such as client computing devices 18, and further communicates with an administrator client device 34 for resources on the server computing device 12. For example, communications from an administrator using administrator client device 34 to access an organization's administrator account on the server computing device 12 will require the administrator to enter server account credentials 35, which will be authenticated by the server-side authentication server 24. In this way, the server system including the server computing device 12 has a different root of trust than the on-premises network 20.

The server computing device 12 includes a processor P and associated volatile memory M and non-volatile memory in the form of storage device 25 that stores instructions that, when executed by the processor P, cause the processor P to implement the functions described herein using portions of volatile memory M and storage device 25. The storage device 25 may be internal, as depicted, or cloud storage accessible by the server computing device 12 via a network.

The processor P of server computing device 12 is configured to execute a security service 26 that communicates with security agents 28 on each of the client computing devices 18 via the wide area network 16 and the on-premises network 20 on which the client computing devices 18 are provisioned. In one particular example, the security service 26 and security agents 28 are the MICROSOFT DEFENDER for endpoint service, which includes malware detection capabilities. Alternatively, other suitable endpoint security platforms may be used as the security service 26 and security agents 28. The security service 26 is configured to receive administrator login credentials 30, such as usernames and passwords, for the router devices 32 on the on-premises network 20. The administrator login credentials 30 are sent to the server computing device 12 by an administrator using an administrator client device 34 on the on-premises network 20. The administrator client device 34 and administrator may be authenticated by authentication server 24 using server account credentials 35 stored in a storage device 25 (such as a cloud storage device) at the server computing device 12 and pre-communicated to the administrator. The server account credentials 35 and/or the administrator login credentials 30 may reside in a dedicated key vault, held in key escrow, or otherwise securely stored on the storage device 25 at the server computing device 12. The authentication server 24 may perform authentication using Role-based access control (RBAC), multi-factor authentication (MFA), Simple Network Management Protocol (SNMP), or Secure Shell (SSH), for example. The administrator login credentials 30 may be stored only in working non-volatile memory and passed to the security agent 28 in a one-time operation, in one example implementation. In another example implementation, the administrator login credentials 30 may be stored in an encrypted form in the storage device 25, which may be a cloud storage device, for later retrieval and use.

The security service 26 is an endpoint security platform configured to detect malicious activities and artifacts on endpoints such as client computing devices 18 using various types of signals that span endpoint and network behaviors. For example, the security service 26 may detect particular types of behavior such as registry events, file system events, networking events, device events, and service events. The security service 26 may include heuristics 62 and trained machine learning models 64 that aggregate and process these various types of signals to generate the analytic output 56 and alerts 58.

In one implementation, the administrator may define a security policy 38 and the administrator login credentials 30 for router device 32 may be uploaded to the server computing device 12 as part of defining the security policy 38. Further, the security policy 38 may include trigger conditions 40 that define when an associated router device configuration action should be taken, and also may include port mirroring configuration settings 42 that are used by the client computing device 18 to implement the router device configuration action once the trigger conditions 40 are met. The trigger conditions 40 and port mirroring configuration settings 42 may be set by the administrator via a user interface presented by the security service 26, or may be programmatically determined by the security service 26.

The processor P of the server computing device 12 is further configured to send a monitoring command 36 to the security agent 28 to cause the security agent 28 to access the router device 32 at the network address using the administrator login credentials 30 and configure the router device 32, according to the port mirroring configuration settings 42, to forward network traffic 44 received by the router device 32 from other computing devices 5 across the WAN 16 or from network devices 17 within the on-premises network 20 to the security agent 28 at the client computing device 18 as mirrored traffic 46 via port mirroring.

The monitoring command 36 includes an on-premises network traffic monitoring policy 38 including the administrator login credentials 30 and port mirroring configuration settings 42, which upon implementation at the security agent 28, causes the security agent 28 to access the router device 32 using the administrator login credentials 30 and configure the router device 32 according to the port mirroring configuration settings 42 to forward network traffic 44 received by the router device 32 to the security agent 28 at the client computing device 18 via port mirroring.

It will be appreciated that network devices 17 includes any hardware device having an IP address on the on-premises network 20 including client computing device 18, authentication server 22, and other client computing devices 19 (laptop computers, desktop computers, and mobile devices, for example) and any other associated networking hardware, servers, and storage devices. The port mirroring configuration settings 42 turn on or off the forwarding of all the network traffic 44 received at each of the source ports SP on the router device 32. The port mirroring configuration settings 42 designate one or a plurality of destination ports DP on the client computing device 18 where the mirrored traffic 46 is to be forwarded by the router device 32.

Once the client computing device 18 has sent its administrator login credentials 30 to the router device 32 and those credentials 30 are authenticated by the on-premises authentication server 22, a token T may be provided to the client computing device 18, so that re-authentication can be avoided for a period of time, and instead the token T can server as proof that the client computing device 18 is a trusted device. The token T may include a validity period, such as one hour, one day, or one week, for example.

Upon receiving the monitoring command 36, the client computing device 18 is configured to implement the policy 38 at the security agent 28, and determine when the trigger conditions 40 are met for configuring the router device 32. The trigger conditions 40, for example, may include a trigger condition that the client computing device 18 has a shortest network distance to the router device 32 in the on-premises network 20, as compared to other client computing devices 19 on the on-premises network 20. The trigger conditions 40 may further include a trigger condition that the client computing device 18 has sufficient processor, memory, storage, or bandwidth resources to receive and process the mirrored traffic 46, and send the monitoring report 48 to the server computing device 12.

Once the mirrored traffic 46 is forwarded, the security agent 28 is configured to process the mirrored traffic 46 and thereby generate an on-premises network traffic monitoring report 48, which is sent via the in-premises network 20 and WAN 16 to the server computing device 12. The server computing device 12 is configured to receive the on-premises network traffic monitoring report 48 from the security agent 28 based on the network traffic 46 forwarded to the client computing device 18. The on-premises network traffic monitoring report 48 can include aggregated network traffic statistics 50 based on raw network traffic 46 forwarded to the security agent 28 and processed at the security agent 28 to produce the aggregated network traffic statistics 50. For example, the aggregated network traffic statistics 50 can include one or more of event logs, security logs, Virtual Private Network (VPN) logs, Active Directory information, and/or entity information.

In one implementation, the router device 32 is a gateway router device, which interconnects the WAN 16 with the on-premises network 20 and functions as both a gateway and a router. In another example, the router device 32 may be configured as a hub or bridge, rather than as a gateway router device. In some cases the gateway router device includes a firewall, proxy server, and/or is configured to convert messages from one transmission protocol to another. When configured as a gateway router device, proxy server, and/or with a firewall, for example, the address space of the on-premises network is not visible to external devices connecting via WAN 16. Typically, the router device 32 is a level 3 device in the Open Systems Interconnect (OSI) model, although when configured as a proxy server or for deep packet inspection, the router device 32 may include functions in higher layers of the OSI model, including the application layer. While monitoring command 36 and monitoring report 48 are depicted as traveling outside of the router device 32 for ease of illustration, it will be appreciated that all traffic from client computing device 18 on the on-premises network 20 including these communications traverses the gateway router device 32.

The server computing device 12 is configured to correlate the network traffic 46 to specific network devices among the plurality of network devices 17 within the on-premises network 20. For example, the server computing device 12 can be configured to generate a network map 52 using distributed device discovery module 54 configured to perform distributed device discovery using the client computing devices 18 to classify a plurality of network devices in the on-premises network 20, and correlate the network traffic 44 to the specific network devices among the plurality of network devices 17 within the on-premises network 20 using the network map 52. According to distributed device discovery, each client computing device 18 outfitted with a security agent 28 within the on-premises network 20 conducts independent device discovery by passively collecting information on devices that originate traffic on the on-premises network 20 and also by sending multicast queries across the on-premises network 20 to collect responses from various hardware devices provisioned on the on-premises network 20. The results from each device discovery process at each client computing device 18 are sent to the distributed device discovery module 54 at the server computing device 12 and aggregated to generate the network map 52.

The mirrored network traffic 46 may include event logs, network traffic to and from domain controllers (e.g., Kerberos authentication, New Technology LAN Manager (NTLM) authentication, Domain Name System (DNS) queries), Active Directory information, and entity information (e.g., names, e-mail addresses, and phone numbers). The security agent 28 subsequently generates and outputs aggregated network traffic statistics 50. The client computing device 18 may aggregate the forwarded the mirrored traffic 46 and generate the aggregated network traffic statistics 50 using a network analysis framework of the security agent 28 configured to inspect the mirrored traffic 46 and generate event logs based on the inspected mirrored network traffic 46. Examples of suitable network analysis frameworks that may be used for this purpose include Zeek, Corelight, and Gigamon. Examples of event logs that may be analyzed to generate, or fully included within, the aggregated network traffic statistics 50 include DNS logs which record DNS queries, HTTP logs which record HTTP queries, security logs which record security events, and VPN logs which record authentication attempts. The logs in the aggregated network traffic statistics 50 may be JSON-formatted, in one specific example. The aggregated network traffic statistics 50 are then sent to the security service 26 of the server computing device 12. In some embodiments, all or a portion of the mirrored traffic 46 may be forwarded by the security agent 28 to the server computing device 12 for analysis by the security service 26.

At the server computing device 12, the security service 26 receives and uses the aggregated network traffic statistics 50 to generate an analytic output 56, which may include a result of network investigations, detections of network breaches, and evaluations of response capabilities. Using dedicated network data parsers 60 and distributed device discovery module 54, the security service 26 correlates the network traffic 38 to specific network devices 17 within the on-premises network 20 using a network map 52, which may be generated by the distributed discovery module 54 during the distributed discovery process, which identifies and classifies the network devices 17 in the on-premises network 20. Analyzing the aggregated network traffic statistics 50, the security service 26 may proactively identify suspicious patterns in the network traffic 44 and indicators of attack (IOA) in the on-premises network 20, and generate alerts 58 pinpointing affected network devices 17 whenever a suspicious pattern or a possible attack is detected. By inspecting the aggregated network traffic statistics 50 for malware, viruses, intrusions, and unauthorized access, the security service 26 may detect security incidents and generate alerts 58 accordingly. The security service 26 may use traffic analysis, behavioral monitoring, or fingerprinting, to identify the type, source, and destination of network traffic 44.

Since the aggregated network traffic statistics 50 includes both traffic from client computing devices 18 and other client computing devices 19 that are managed by the security service 26, traffic from other network devices 17 that are not managed by the security service 26, and traffic from other computing devices 5 accessing the on-premises network 20 from external locations across WAN 16, network visibility may be enhanced for the administrator. As a result, incidents that compromise security can be detected both for network devices 17, and also for other computing devices 5 outside the on-premises network 20.

Although the example of FIG. 1 was discussed above using a single client computing device 18 provisioned with a security agent 28 as an example, in practical deployments it will be appreciated that tens, hundreds, thousands, or even millions of client computing devices may be provisioned with security agents 28 on different subnetworks of on-premises networks 20 of an organization, and these client computing devices may each be provisioned with respective security policies. The functions of the security service 26 and security agent 28 described above thus may be understood to apply to a security service that communicates with a plurality of such security agents 28 provisioned across an organization's on-premises network 20. An illustrative example of such a configuration is shown in FIG. 2, described below.

Figure 2:
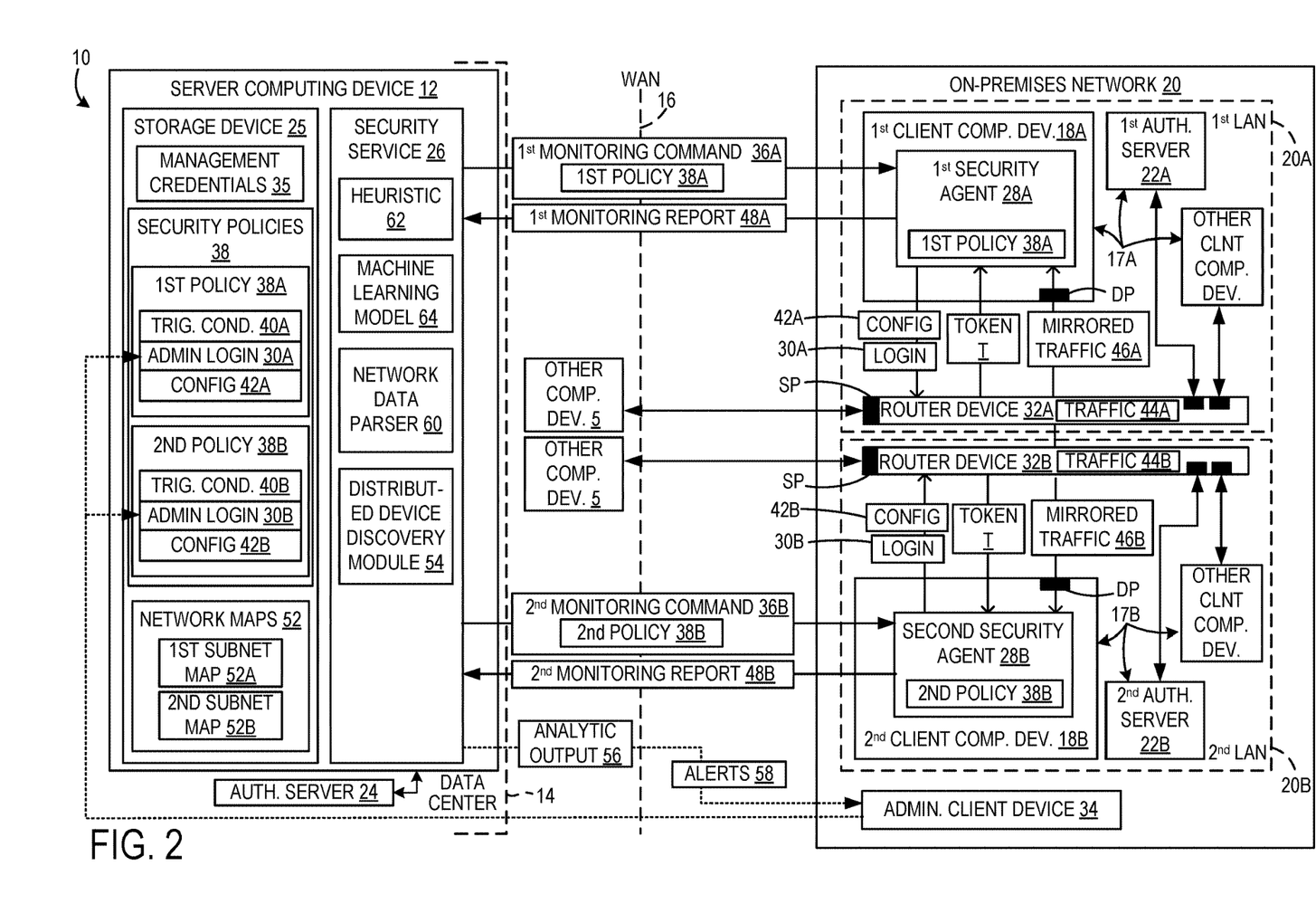
FIG. 2 shows a schematic view of the computing system of FIG. 1, showing a plurality of subnetworks within the on-premises network.

FIG. 2 shows a view of computing system 10 in which a plurality of client computing devices 18 are provided within respective subnetworks 20A, 20B of the on-premises network 20. In FIG. 2, the client computing device of FIG. 1 is a first client computing device 18A executing a first security agent 28A and receiving a first monitoring command 36A, the router device of FIG. 1 is a first router device 32A carrying first network traffic 44A, the on-premises network of FIG. 1 is a first on-premises network 20A having a first plurality of network devices 17A including the first client computing device 18A. Further, the policy of FIG. 1 is a first policy 38A including first trigger conditions 40A, first administrator login credentials 30A, and first port mirroring configuration settings 42A. The network map 52 of FIG. 1 is a first subnetwork map 52A.

As shown, the computing system 10 of FIG. 2 further includes a second router device 32B configured to receive network traffic 44B in a second on-premises network 20B having a second plurality of network devices 17B including a second client computing device 18B. It will be appreciated that the first on-premises network 20A is a first subnetwork of on-premises network 20, and router device 32A is a gateway router device for the first subnetwork. Likewise, the second on-premises network 20B is a second subnetwork of on-premises network 20, and router device 32B is a gateway router device for the second subnetwork. Respective first and second authentication servers 22A, 22B are provided for authentication of resource access requests on each of the first and second subnetworks 20A, 20B. Administrator client device 34 has respective administrator login credentials 30A, 30B for the corresponding router devices 32A, 32B on each subnetwork 20A, 20B. The security service 26 is configured to use distributed device discovery module 54 to collect device discovery information from each of subnetworks 20A, 20B, and generate first subnetwork map 52A and second subnetwork map 52B.

The security service 26 of the server computing device 12 is configured to communicate with a second security agent 28B on the second client computing device 18B via the wide area network 16 and the second on-premises network 20B. The security service 26 is configured to receive and store, in the storage device 25 (such as a cloud storage device) at the server computing device 12, second administrator login credentials 30B for a second gateway router device 32B having a second network address on the second on-premises network 20B. The second administrator login credentials 30B are included in second policy 38B, which also includes second trigger conditions 40B and second port mirroring configuration settings 42B, which are to be applied to the router device 32B of subnetwork 20B, similar to the manner described above for the configuration of the router device of FIG. 1 according to the policy of FIG. 1. The security service 26 of the server computing device is further configured to send a second monitoring command 36B to the second security agent 28B to cause the second security agent 28B to access the second gateway router device 32B at the second network address using the second administrator login credentials 30B and configure the second gateway router device 32B to forward second network traffic 44B received by the second router device 32B to the second security agent 28B at the second client computing device 18B via port mirroring. This may be accomplished by sending the second policy 38B, including the second port mirroring configuration settings 42B, to the second security agent 28B for implementation at the second client computing device 18B, to thereby configure the second router device 32B to forward second network traffic 44B as second mirrored traffic 46B to the second client computing device 18B, according to the second port mirroring configuration settings 42B. First mirrored traffic 46A is forwarded as discussed above for mirrored traffic 46 in FIG. 1.

The security service 26 of the server computing device 12 is further configured to receive a second on-premises network traffic monitoring report 48B from the second security agent 28B based on the second network traffic 44B forwarded to the second client computing device 18B. The second on-premises network traffic monitoring report 48B includes similar aggregated network traffic statistics generated by the second security agent 28B in a similar manner as described above for the first monitoring report 48A (i.e., monitoring report 48 of FIG. 1).

Although two subnetworks are shown in FIG. 2, it will be appreciated that these are merely exemplary, and that in practice, tens, hundreds, or even millions of such subnetworks may exist on the on-premises network 20. The technical benefits of such a configuration over prior approaches will be understood to be particularly advantageous in such large scale networks, since the manual installation of conventional dedicated physical TAP devices in such large scale networks is particularly burdensome.

Figure 3:
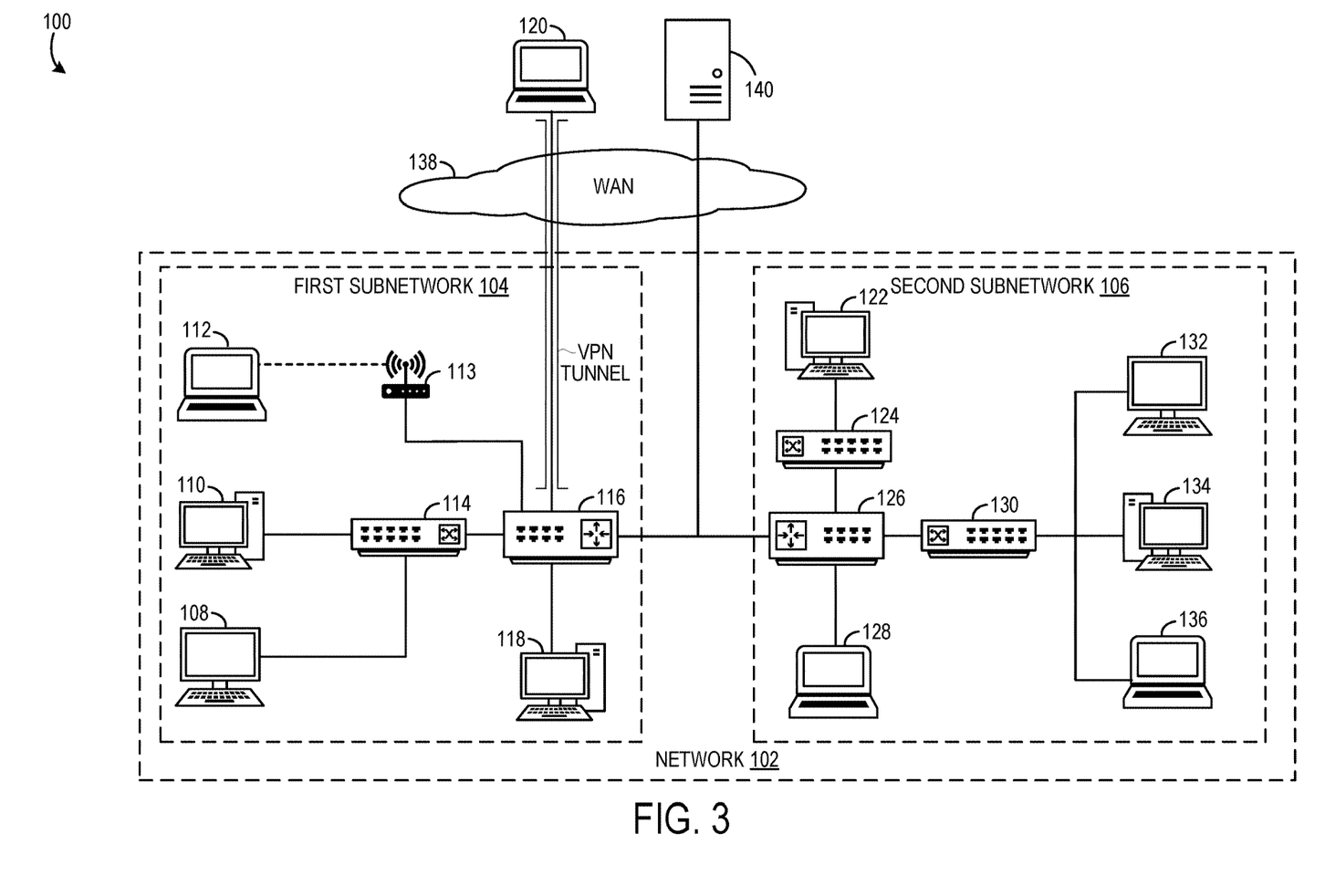
FIG. 3 shows a schematic view of an example use case of the secure computing system of FIG. 1, illustrating aspects of the present disclosure.

With reference to FIG. 3, an example use case illustrating aspects of the present disclosure will now be presented. A computing system 100 is depicted, which is a particular implementation of computing system 10, comprising a first subnetwork 104 and a second subnetwork 106 within one network 102. The devices within the first subnetwork 104 are all connected to the first router device 116, while the devices within the second subnetwork 106 are all connected to the second router device 126. The first router device 116 and the second router device 126 are connected to each other, and also communicate with the Internet 138 and a security service hosted as a cloud service at server computing device 140.

In the first subnetwork 104, a first desktop computer 118 is directly connected to the first router 116 within the LAN network of the first subnetwork 104, while a first laptop computer 120 is connected to the first router 116 via a VPN tunnel over the Internet 138. A first computer terminal 108 and a second desktop computer 110 are connected to a first network switch 114, which is in turn directly connected to the first router 116. A second laptop computer 112 is connected wirelessly to a wireless access point (WAP) 113, which is in turn connected to the router device 116.

In the second subnetwork 106, a third laptop computer 128 is directly connected to the second router device 126. A second network switch 124 and a third network switch 130 are directly connected to the second router device 126. The second network switch 124 is connected to a third desktop computer 122, while a second computer terminal 132, a fourth desktop computer 134, and fourth laptop computer 136 are connected to the third network switch 130.

Each computing device in the network 102 sends a request to a security service on the server computing device 140 for a policy configuration. Responsive to receiving the request, the security service of server computing device 140 performs authentication of the requesting device, and then determines which of the computing devices should be assigned the role of being a selected agent to receive forwarded network traffic within the subnetwork. In the first subnetwork 104, the network distances between a given device and the first router 116 are calculated based on a number of "hops" (e.g., number of OSI Level 2 devices such as network switches) between the given device and the first router 116. The security service determines that the network distance between the first desktop computer 118 and the first router 116 is the shortest, since the connection between the two devices is direct with no intervening network switches. The security service further confirms that the first desktop computer 118 has adequate computing resources to receive forwarded network traffic from the first router 116, by checking the processor load, available memory, available storage in non-volatile memory. Once sufficient resources have been confirmed, the security service authenticates the first desktop computer 118 as the selected agent for receiving forwarded network traffic from the first router 116, and configures a security agent on the first desktop computer to configure the port monitoring settings on the router device 116 to forward network traffic in the manner described above.

In the second subnetwork 106, the network distances between a given device and second router 126 are calculated based on a number of hops between OSI Level 2 devices (such as network switches) that occur between the given device and the second router 126. The security service determines that the network distance between the third laptop computer 128 and the first router 116 is the shortest, since the connection between the two devices is direct with no intervening network switches. However, the security service determines that the third laptop computer 128 has inadequate computing resources to receive forwarded network traffic from the second router 126, for example, due to processor load and memory usage being above set thresholds. Therefore, the security service identifies the computing device with the next closest network distance from the second router 126. However, it is determined that the rest of the computing devices are all separated from the second router 126 by just one network switch, so the rest of the devices are equidistant from the second router 126 when calculating network distance based on the number of network switches between the given device and the second router 126.

In this scenario, another network distance calculation method may be implemented to determine the device with the closest network distance from the second router 126. For example, network distances may be determined by measuring a round-trip time between a given device and the second router 126. Alternatively, the computing resources of the rest of the devices 122, 132, 134, 136 may be compared to each other, and the device with the most computing resources may be authenticated as the selected agent to received forwarded network traffic from the second router 126. For example, the second computer terminal 132 may be configured as the selected agent upon being determined to have the most computing resources among the computing devices in the second subnetwork 106. IP whitelisting may also be implemented to filter the rest of the devices 122, 132, 134, 136, to only permit devices with specific IP addresses or ranges to be the selected agent.

When the first desktop computer 118 is selected and configured as the selected agent for the first subnetwork 104, the security service communicates with the security agent of the first desktop computer 118 and sends a policy to the security agent of the first desktop computer 118. The security agent of the first desktop computer 118 subsequently uses the policy to configure the first router 116 to forward network traffic received by the first router 116 to the first desktop computer 118 via port mirroring. Likewise, when the second computer terminal 132 is configured as the selected agent for the second subnetwork 106, the security service authenticates the security agent of the second computer terminal 132 and sends a policy to the security agent of the second computer terminal 132. The security agent of the second computer terminal 132 subsequently uses the policy to configure the second router 126 to forward network traffic received by the second router 126 to the second computer terminal 132 via port mirroring.

Figure 4:
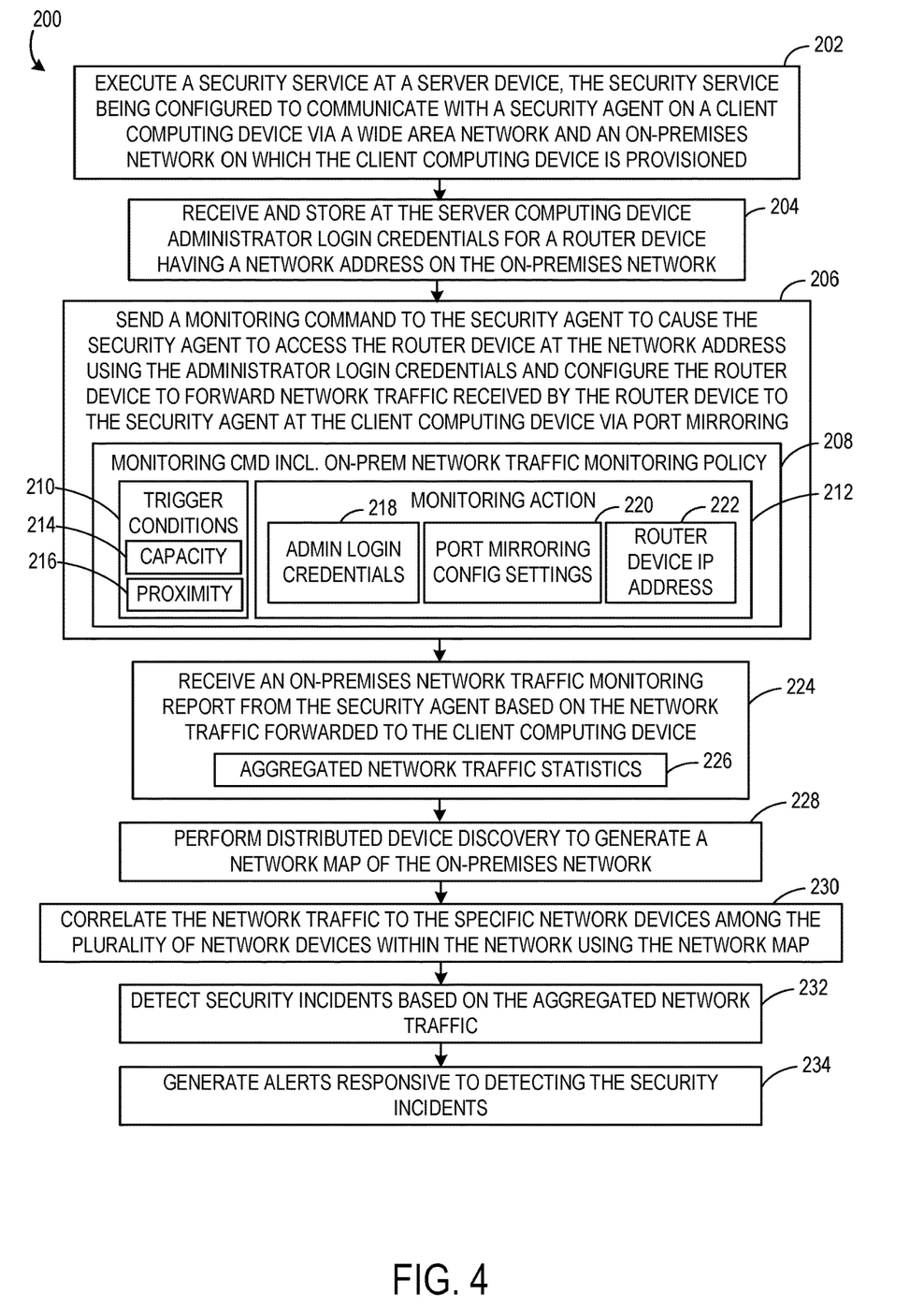
FIG. 4 shows a flowchart of a computerized method, according to an example embodiment of the present disclosure.

Turning to FIG. 4, a flowchart is illustrated of a computerized method 200 for configuring a gateway device to mirror and forward network traffic to a client computing device via port mirroring. The following description of computerized method 200 is provided with reference to the software and hardware components described above and shown in FIGS. 1 to 3. It will be appreciated that computerized method 200 also can be performed in other contexts using other suitable hardware and software components.

At 202, method 200 includes executing a security service at a server computing device. The security service is configured to communicate with a security agent on a client computing device via a wide area network and an on-premises network on which the client computing device is provisioned. At 204, the method includes receiving administrator login credentials for a router device having a network address on the on-premises network. At 206, the method includes sending a monitoring command to the security agent to cause the security agent to access the router device at the network address using the administrator login credentials and configure the router device to forward network traffic received by the router device to the security agent at the client computing device via port mirroring. As shown at 208, the monitoring command can include an on-premises network traffic monitoring policy. The on-premises network traffic monitoring policy can include trigger conditions, as shown at 210, and an associated monitoring action, as shown at 212, to be taken when the trigger conditions are satisfied. The trigger conditions can include capacity conditions, as shown at 214, such as processor usage, memory usage, and storage device usage as discussed above, and can further include a proximity condition, as shown at 216, such as being the closest distance device on the network. The monitoring action can include administrator login credentials, as shown at 218, and port mirroring configuration settings, as shown at 220, and the router device internet protocol address, as shown at 222. The port mirroring configuration settings can designate one or a plurality of destination ports on the client computing device where the mirrored network traffic is to be forwarded by the router device, and/or one or a plurality of source ports on the router device to receive the network traffic which is to be mirrored.

Upon implementation at the security agent, the on-premises network traffic monitoring policy causes the security agent to access the router device using the administrator login credentials and configure the router device according to the port mirroring configuration settings to forward network traffic received by the router device to the security agent at the client computing device via port mirroring.

At 224, the method includes receiving an on-premises network traffic monitoring report from the security agent based on the network traffic forwarded to the client computing device. The on-premises network traffic monitoring report can include aggregated network traffic statistics based on raw network traffic forwarded to the security agent and processed at the security agent to produce the aggregated network traffic statistics. The on-premises network traffic monitoring report can also include information obtained through deep packet inspection either at the security agent or at the server client device. Such information may include information gleaned from the data payload of the packets, after reconstruction at the application layer. For example, for packets containing a text message, the deep packet inspection can reveal content of the message, and for packets containing an image, the deep packet inspection can reveal the content of the image. As shown at 226, the on-premises network traffic monitoring report can include aggregated network traffic statistics based on the network traffic forwarded to the security agent and processed at the security agent to produce the aggregated network traffic statistics. The aggregated network traffic statistics can include one or more of event logs, security logs, VPN logs, Active Directory information, and/or entity information, as some examples.

Method 200 may further include correlating the network traffic to specific network devices within the network. For example, as shown at 228, the method may include performing distributed device discovery and generating a network map using the distributed discovery to classify the plurality of network devices in the on-premises network. And, at 230, the method may further include correlating the network traffic to the specific network devices among the plurality of network devices within the on-premises network using the generated network map.

At 232, the method may include detecting security incidents based on the aggregated network traffic statistics, and at 234, the method may include generating alerts responsive to detecting the security incidents.

The above-described system and method describe configuring a client computing device to receive forwarded network traffic from a gateway device, thereby achieving adequate network visibility without deploying any additional hardware devices. Accordingly, network traffic monitoring may be set up with little effort and minimal load on the network.

In some embodiments, the methods and processes described herein may be tied to a computing system of one or more computing devices. In particular, such methods and processes may be implemented as a computer-application program or service, an application-programming interface (API), a library, and/or other computer-program product executed by the one or more computing devices.

Figure 5:
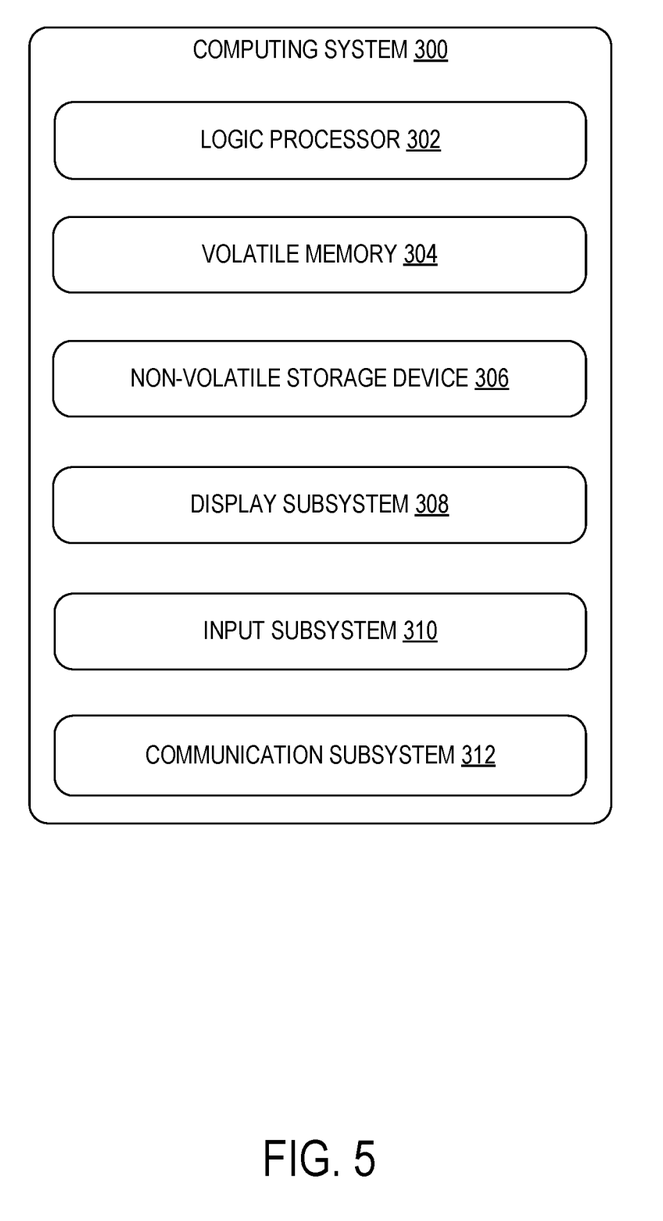
FIG. 5 shows a schematic view of an example computing environment that may be used to implement the systems and methods of FIGS. 1-4.

FIG. 5 schematically shows a non-limiting embodiment of a computing system 300 that can enact one or more of the methods and processes described above. Computing system 300 is shown in simplified form. Computing system 300 may embody the server computer device 12, client computing device 18, and other computing devices described above and illustrated in FIG. 1-3. Computing system 300 may take the form of one or more personal computers, server computers, tablet computers, home-entertainment computers, network computing devices, gaming devices, mobile computing devices, mobile communication devices (e.g., smart phone), and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 5.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor 302 may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor 302 optionally may be distributed among two or more separate devices, which may be remotely located and/or configured for coordinated processing. Aspects of the logic processor 302 may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology that may be used in cloud storage. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch pad, touch screen, microphone, camera, etc.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem 312 may be configured for communication via a wireless telephone network, or a wired or wireless local- or wide-area network. In some embodiments, the communication subsystem 312 may allow computing system 300 to send and/or receive messages to and/or from other devices via a network such as the Internet.

The following paragraphs provide additional support for the claims of the subject application. One aspect provides a computing system comprising a server computing device comprising a processor configured to execute a security service configured to communicate with a security agent on a client computing device via a wide area network and an on-premises network on which the client computing device is provisioned, receive and store, at the server computing device, administrator login credentials for a router device having a network address on the on-premises network, send a monitoring command to the security agent to cause the security agent to access the router device at the network address using the administrator login credentials and configure the router device to forward network traffic received by the router device to the security agent at the client computing device via port mirroring, and receive an on-premises network traffic monitoring report from the security agent based on the network traffic forwarded to the client computing device. In this aspect, additionally or alternatively, the monitoring command may comprise an on-premises network traffic monitoring policy comprising the administrator login credentials and port mirroring configuration settings, which upon implementation at the security agent, causes the security agent to access the router device using the administrator login credentials and configure the router device according to the port mirroring configuration settings to forward network traffic received by the router device to the security agent at the client computing device via port mirroring. In this aspect, additionally or alternatively, the port mirroring configuration settings may designate one or a plurality of destination ports on the client computing device where the network traffic is to be forwarded by the router device. In this aspect, additionally or alternatively, the router device may be a hub or a bridge. In this aspect, additionally or alternatively, the on-premises network traffic monitoring report may comprise aggregated network traffic statistics based on the network traffic forwarded to the security agent and processed at the security agent to produce the aggregated network traffic statistics. In this aspect, additionally or alternatively, the server computing device may be configured to correlate the network traffic to specific network devices among a plurality of network devices within the on-premises network. In this aspect, additionally or alternatively, the server computing device may be configured to generate a network map using distributed discovery to classify a plurality of network devices in the on-premises network, and the server computing device may be configured to correlate the network traffic to specific network devices among the plurality of network devices within the on-premises network using the network map. In this aspect, additionally or alternatively, the aggregated network traffic statistics may comprise at least one selected from the group of event logs, security logs, Virtual Private Network (VPN) logs, Active Directory information, and entity information. In this aspect, additionally or alternatively, the on-premises network traffic monitoring policy may further comprise one or more trigger conditions, the one or more trigger conditions comprising a condition that the client computing device has a shortest network distance to the router device in the on-premises network. In this aspect, additionally or alternatively, the router device may be a gateway router device. In this aspect, additionally or alternatively, the client computing device may be a first client computing device, the gateway router device may be a first gateway router device, the on-premises network may be a first on-premises network having a first plurality of network devices comprising the first client computing device, the computing system may further comprise a second gateway router device configured to receive network traffic in a second on-premises network having a second plurality of network devices comprising a second client computing device, the security service of the server computing device further configured to communicate with a second security agent on the second client computing device via the wide area network and the second on-premises network, receive and store, at the server computing device, second administrator login credentials for the second gateway router device having a second network address on the second on-premises network, send a second monitoring command to the second security agent to cause the second security agent to access the second gateway router device at the second network address using the second administrator login credentials and configure the second gateway router device to forward network traffic received by the second gateway router device to the second security agent at the second client computing device via port mirroring, and receive a second on-premises network traffic monitoring report from the second security agent based on the network traffic forwarded to the second client computing device.

Another aspect provides a computerized method comprising executing a security service at a server computing device, the security service being configured to communicate with a security agent on a client computing device via a wide area network and an on-premises network on which the client computing device is provisioned, receiving and storing, at the server computing device, administrator login credentials for a router device having a network address on the on-premises network, sending a monitoring command to the security agent to cause the security agent to access the router device at the network address using the administrator login credentials and configure the router device to forward network traffic received by the router device to the security agent at the client computing device via port mirroring, and receiving an on-premises network traffic monitoring report from the security agent based on the network traffic forwarded to the client computing device. In this aspect, additionally or alternatively, the monitoring command may comprise an on-premises network traffic monitoring policy comprising the administrator login credentials and port mirroring configuration settings, which upon implementation at the security agent, causes the security agent to access the router device using the administrator login credentials and configure the router device according to the port mirroring configuration settings to forward network traffic received by the router device to the security agent at the client computing device via port mirroring. In this aspect, additionally or alternatively, the port mirroring configuration settings may designate one or a plurality of destination ports on the client computing device where the network traffic is to be forwarded by the router device. In this aspect, additionally or alternatively, the on-premises network traffic monitoring report may comprise aggregated network traffic statistics based on the network traffic forwarded to the security agent and processed at the security agent to produce the aggregated network traffic statistics. In this aspect, additionally or alternatively, the method may further comprise correlating the network traffic to specific network devices among a plurality of network devices within the network. In this aspect, additionally or alternatively, the method may further comprise generating a network map using distributed discovery to classify the plurality of network devices in the on-premises network, and correlating the network traffic to the specific network devices among the plurality of network devices within the on-premises network using the network map. In this aspect, additionally or alternatively, the aggregated network traffic statistics may comprise at least one selected from the group of event logs, security logs, Virtual Private Network (VPN) logs, Active Directory information, entity information.

Another aspect provides a computing system, comprising a client computing device comprising a processor configured to execute a security agent configured to communicate with a security service on a server computing device via a wide area network and an on-premises network on which the client computing device is provisioned, and via the executed security agent executed at the client computing device receive a monitoring command from the security service, access a router device provisioned at a network address on the on-premises network using administrator login credentials received from the security service, and configure the router device to forward network traffic received by the router device to the security agent at the client computing device via port mirroring, receive and process the forwarded network traffic to generate an on-premises network traffic monitoring report, and send the on-premises network traffic monitoring report to the security service of the server computing device. In this aspect, additionally or alternatively, the monitoring command may comprise an on-premises network traffic monitoring policy comprising the administrator login credentials and port mirroring configuration settings, which upon implementation at the security agent causes the security agent to access the router device using the administrator login credentials and configure the router device according to the port mirroring configuration settings to forward network traffic received by the router device to the security agent at the client computing device via port mirroring. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
    a server computing device comprising a processor configured to:
        execute a security service configured to communicate with a security agent on a client computing device via a wide area network and an on-premises network on which the client computing device is provisioned;
        receive and store, at the server computing device, administrator login credentials for a router device having a network address on the on-premises network;
        send a monitoring command to the security agent to cause the security agent, on the on-premises network, to establish a secure session with the router device at the network address using the administrator login credentials and configure the router device to forward network traffic received by the router device to the security agent at the client computing device via port mirroring; and
        receive an on-premises network traffic monitoring report from the security agent based on the network traffic forwarded to the client computing device.

2. The computing system of claim 1, wherein the monitoring command comprises an on-premises network traffic monitoring policy comprising the administrator login credentials and port mirroring configuration settings, which upon implementation at the security agent, causes the security agent to access the router device using the administrator login credentials and configure the router device according to the port mirroring configuration settings to forward network traffic received by the router device to the security agent at the client computing device via port mirroring.

3. The computing system of claim 2, wherein the port mirroring configuration settings designate one or a plurality of destination ports on the client computing device where the network traffic is to be forwarded by the router device.

4. The computing system of claim 2, wherein the on-premises network traffic monitoring policy further comprises one or more trigger conditions, the one or more trigger conditions comprising a condition that the client computing device has a shortest network distance to the router device in the on-premises network.

5. The computing system of claim 1, wherein the router device is a hub or a bridge.

6. The computing system of claim 1, wherein the on-premises network traffic monitoring report comprises aggregated network traffic statistics based on the network traffic forwarded to the security agent and processed at the security agent to produce the aggregated network traffic statistics.

7. The computing system of claim 6, wherein the server computing device is configured to correlate the network traffic to specific network devices among a plurality of network devices within the on-premises network.

8. The computing system of claim 6, wherein
the server computing device is configured to generate a network map using distributed discovery to classify a plurality of network devices in the on-premises network; and
the server computing device is configured to correlate the network traffic to specific network devices among the plurality of network devices within the on-premises network using the network map.

9. The computing system of claim 6, wherein the aggregated network traffic statistics comprises at least one selected from the group of event logs, security logs, Virtual Private Network (VPN) logs, Active Directory information, and entity information.

10. The computing system of claim 1, wherein the router device is a gateway router device.

11. The computing system of claim 10, wherein
the client computing device is a first client computing device;
the gateway router device is a first gateway router device;
the on-premises network is a first on-premises network having a first plurality of network devices comprising the first client computing device; and
the computing system further comprising:
a second gateway router device configured to receive network traffic in a second on-premises network having a second plurality of network devices comprising a second client computing device; and
the security service of the server computing device is further configured to:
communicate with a second security agent on the second client computing device via the wide area network and the second on-premises network;
receive and store, at the server computing device, second administrator login credentials for the second gateway router device having a second network address on the second on-premises network;
send a second monitoring command to the second security agent to cause the second security agent to access the second gateway router device at the second network address using the second administrator login credentials and configure the second gateway router device to forward network traffic received by the second gateway router device to the second security agent at the second client computing device via port mirroring; and
receive a second on-premises network traffic monitoring report from the second security agent based on the network traffic forwarded to the second client computing device.

12. A computerized method comprising:
executing a security service at a server computing device, the security service being configured to communicate with a security agent on a client computing device via a wide area network and an on-premises network on which the client computing device is provisioned;
receiving and storing, at the server computing device, administrator login credentials for a router device having a network address on the on-premises network;
sending a monitoring command to the security agent to cause the security agent, on the on-premises network, to establish a secure session with the router device at the network address using the administrator login credentials and configure the router device to forward network traffic received by the router device to the security agent at the client computing device via port mirroring; and
receiving an on-premises network traffic monitoring report from the security agent based on the network traffic forwarded to the client computing device.

13. The computerized method of claim 12, wherein the monitoring command comprises an on-premises network traffic monitoring policy comprising the administrator login credentials and port mirroring configuration settings, which upon implementation at the security agent, causes the security agent to access the router device using the administrator login credentials and configure the router device according to the port mirroring configuration settings to forward network traffic received by the router device to the security agent at the client computing device via port mirroring.

14. The computerized method of claim 13, wherein the port mirroring configuration settings designate:
one or a plurality of destination ports on the client computing device where the network traffic is to be forwarded by the router device.

15. The computerized method of claim 12, wherein the on-premises network traffic monitoring report comprises aggregated network traffic statistics based on the network traffic forwarded to the security agent and processed at the security agent to produce the aggregated network traffic statistics.

16. The computerized method of claim 15, further comprising correlating the network traffic to specific network devices among a plurality of network devices within the on-premises network.

17. The computerized method of claim 16, further comprising:
generating a network map using distributed discovery to classify the plurality of network devices in the on-premises network; and
correlating the network traffic to the specific network devices among the plurality of network devices within the on-premises network using the network map.

18. The computerized method of claim 15, wherein the aggregated network traffic statistics comprises at least one selected from the group of event logs, security logs, Virtual Private Network (VPN) logs, Active Directory information, entity information.

19. A computing system, comprising:
a client computing device comprising a processor configured to:
execute a security agent configured to communicate with a security service on a server computing device via a wide area network and an on-premises network on which the client computing device is provisioned; and
via the executed security agent executed at the client computing device on the on-premises network:
receive a monitoring command from the security service;
establish a secure session with a router device provisioned at a network address on the on-premises network using administrator login credentials received from the security service, and configure the router device to forward network traffic received by the router device to the security agent at the client computing device via port mirroring;
receive and process the forwarded network traffic to generate an on-premises network traffic monitoring report; and
send the on-premises network traffic monitoring report to the security service of the server computing device.

20. The computing system of claim 19, wherein the monitoring command comprises an on-premises network traffic monitoring policy comprising the administrator login credentials and port mirroring configuration settings, which upon implementation at the security agent causes the security agent to access the router device using the administrator login credentials and configure the router device according to the port mirroring configuration settings to forward network traffic received by the router device to the security agent at the client computing device via port mirroring.

* * * * *